US008678227B2

(12) United States Patent
Patstone

(10) Patent No.: US 8,678,227 B2
(45) Date of Patent: Mar. 25, 2014

(54) LEG ASSEMBLY

(75) Inventor: Christopher H. Patstone, Northampton, MA (US)

(73) Assignee: Hardigg Industries, Inc., Deerfield, MA (US)

(*) Notice: Subject to any disclaimer, the term of this patent is extended or adjusted under 35 U.S.C. 154(b) by 1095 days.

(21) Appl. No.: 11/861,389

(22) Filed: Sep. 26, 2007

(65) Prior Publication Data

US 2009/0078593 A1 Mar. 26, 2009

(51) Int. Cl.
*B65D 25/24* (2006.01)
*B65D 1/42* (2006.01)
*B65D 6/34* (2006.01)
*B65D 8/08* (2006.01)
*A47G 29/00* (2006.01)
*F16M 11/00* (2006.01)
*B65D 77/00* (2006.01)
*A45F 3/00* (2006.01)
*A47B 3/10* (2006.01)

(52) U.S. Cl.
USPC ........... 220/629; 220/647; 248/692; 206/216; 190/11

(58) Field of Classification Search
USPC .................... 220/629, 647; 206/216; 248/692
See application file for complete search history.

(56) References Cited

U.S. PATENT DOCUMENTS

| 1,365,139 | A | | 1/1921 | Winitowy |
| 2,805,905 | A | | 9/1957 | Levitan et al. |
| 2,907,471 | A | * | 10/1959 | Henry ........................... 108/109 |
| 2,967,037 | A | * | 1/1961 | Christle ......................... 108/35 |
| 4,581,902 | A | | 4/1986 | Starck et al. |
| 4,706,817 | A | | 11/1987 | Greathouse |
| 4,821,649 | A | * | 4/1989 | Andersson ..................... 108/107 |
| 5,370,254 | A | | 12/1994 | Hardigg et al. |
| 5,507,385 | A | * | 4/1996 | Koloski et al. ................. 206/372 |
| 5,833,333 | A | | 11/1998 | Brown |
| 6,318,713 | B1 | | 11/2001 | Levi |

* cited by examiner

*Primary Examiner* — Anthony Stashick
*Assistant Examiner* — Andrew T Kirsch
(74) *Attorney, Agent, or Firm* — McCormick Paulding & Huber LLP

(57) ABSTRACT

A leg assembly for selective attachment to a portable support structure having a base and removable lid. The leg assembly includes a plurality of legs that are selectively attachable to both the base and lid. When attached, the legs extending from the base to the lid thereby supporting the lid. The legs are substantially parallel to one another. The assembly further includes at least one cross member extending between two of the legs to stabilize and prevent lateral movement of the legs. The cross member also abutingly contacts and supports the lid whereby the base and lid function as a support structure.

16 Claims, 5 Drawing Sheets

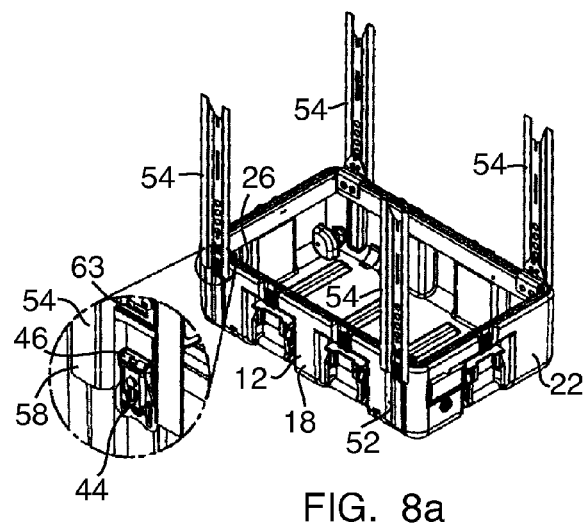
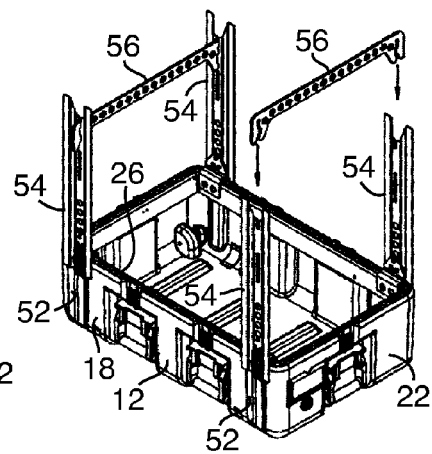
FIG. 8a        FIG. 8b
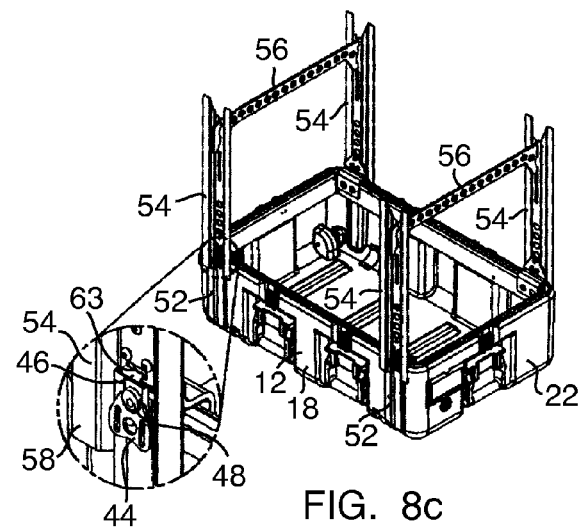
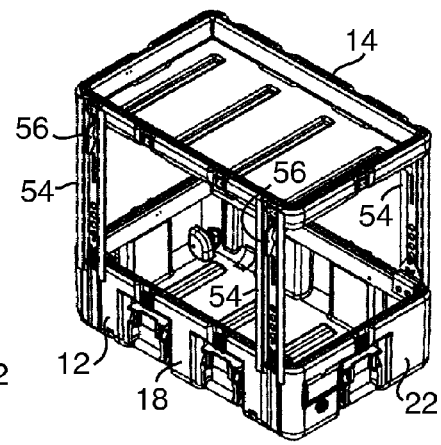
FIG. 8c        FIG. 8d

LEG ASSEMBLY

FIELD OF THE INVENTION

This invention relates generally to a leg assembly, and more particularly to a leg assembly that may be removably secured to a storage case to provide a stable and lightweight base so that the case may be optionally used as a support structure such as a table.

BACKGROUND OF THE INVENTION

Known storage cases may be selectively converted for use as a support structure such as a table. One such case has been used in military applications and in particular as a chest to store equipment for use by medical personnel. The case is manufactured from metal and includes four relatively wide metal legs that attach to both a base portion of the case and a lid portion, which forms a support surface. These cases are typically rectangular and include front, back and sidewalls. When configured as a table, the base portion has an open interior cavity that can be accessed by reaching between the legs.

Such cases are relatively unstable, however, as the legs are secured through a passive bracketing system. This system employs substantially U-shaped brackets secured to exterior walls of the base and lid. The legs slide into the brackets and are held against the exterior walls of the case. The brackets are located on the sidewalls of the base and lid and on the back walls of the same. The brackets are passive in that they merely receive the legs and do not clamp or tighten down on them in any way. As will be appreciated, wear and tear on these cases during use can cause tolerances between the passive brackets and the legs to increase. Tolerance increases can, in turn, result in lateral movement of the lid relative to the base and instability of the support structure.

Additionally, known cases do not include any ancillary structural supports, such as cross members, that bridge and stabilize the legs and help support the weight of the relatively heavy metal lid. This lack of supplemental support further adds to the instability of the legs and impairs the efficacy of such cases in the field.

Moreover, the legs of known cases do not allow attachment of lids with varying depths. As will be appreciated, cases with larger capacities have lids and bases with deeper sidewalls. In known systems, different sets of legs are required for each size lid to keep the support surface of the lid at a height that is comfortable for use as a table or the like. This requires the manufacture, stocking and deployment of multiple legs depending on the capacity of the case and size of the lid.

The legs of these cases are also quite wide and spaced in a configuration that does not allow for easy access to an interior cavity of the base. As stated above, two of the legs are secured to the sidewalls of the case. More specifically, the legs are secured to a portion of the sidewalls that is proximate the front wall of the base. Given the width of the legs, access to the interior cavity of the base is partially obstructed. This can be problematic if the cases are deployed for field use by military medical personnel who need to quickly locate and extract equipment.

With the foregoing problems and concerns in mind, the general object of the present invention is to provide a leg assembly for a storage case, in particular a leg assembly that provides superior stability, allows for attachment of case lids of various sizes, and provides easy access to an interior cavity of a storage case base.

SUMMARY OF THE INVENTION

It is an object of the present invention to provide a leg assembly.

It is an additional object of the present invention to provide a leg assembly for a storage case.

It is an object of the present invention to provide a lightweight leg assembly for a storage case.

It is a further object of the present invention to provide a leg assembly for a storage case that can be used to securely and stably support a lid of the case so that the case may be used as a support structure such as a table.

It is yet another object of the present invention to provide a lightweight leg assembly for a storage case that can be used to securely and stably support a lid of the storage case to that the case may be used as a support structure through the use of an active bracketing system and cross-braces.

It is an additional object of the present invention to provide a leg assembly for a storage case that may be used with case lids of varying sizes.

It is a further object of the present invention to provide a leg assembly for a storage case that allows for unobstructed access to an interior cavity of a base of the storage case.

These and other advantages of the present invention will be better understood in view of the Figures and preferred embodiment described herein.

BRIEF DESCRIPTION OF THE DRAWINGS

FIG. 3b shows a back view of the single leg and mounting bracket of FIG. 3a.

FIGS. 4a-4c show various additional views of the single leg and mounting bracket of FIG. 3a.

FIGS. 5a and 5b show various views of the mounting bracket of the single leg of FIG. 3a.

FIGS. 8a-8d show the leg assembly and storage case of FIG. 1 and graphically illustrate the process by which the leg assembly is secured to the storage case for use as a support structure.

DETAILED DESCRIPTION OF THE PREFERRED EMBODIMENT

Figure 1:
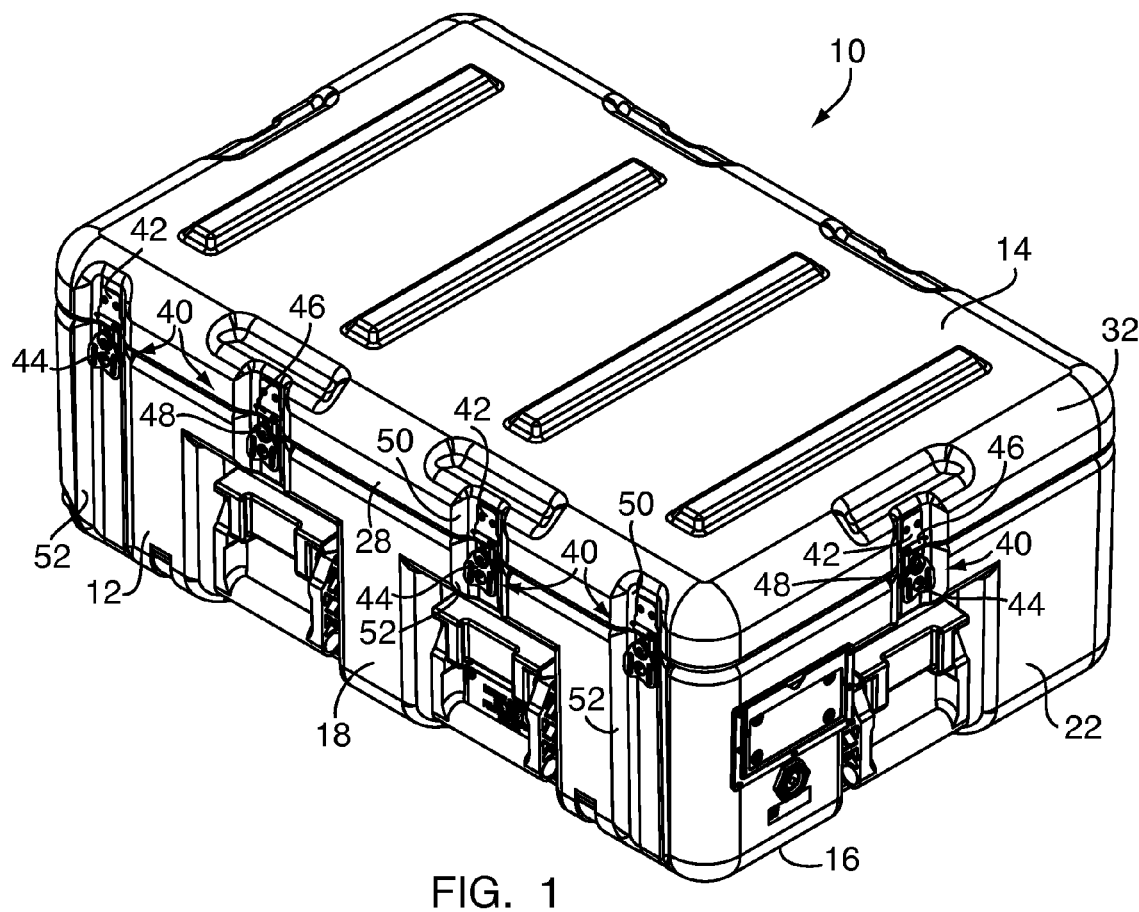
FIG. 1 shows a perspective view of a closed storage case for use with a leg assembly according to the preferred embodiment of the present invention.
Figure 2:
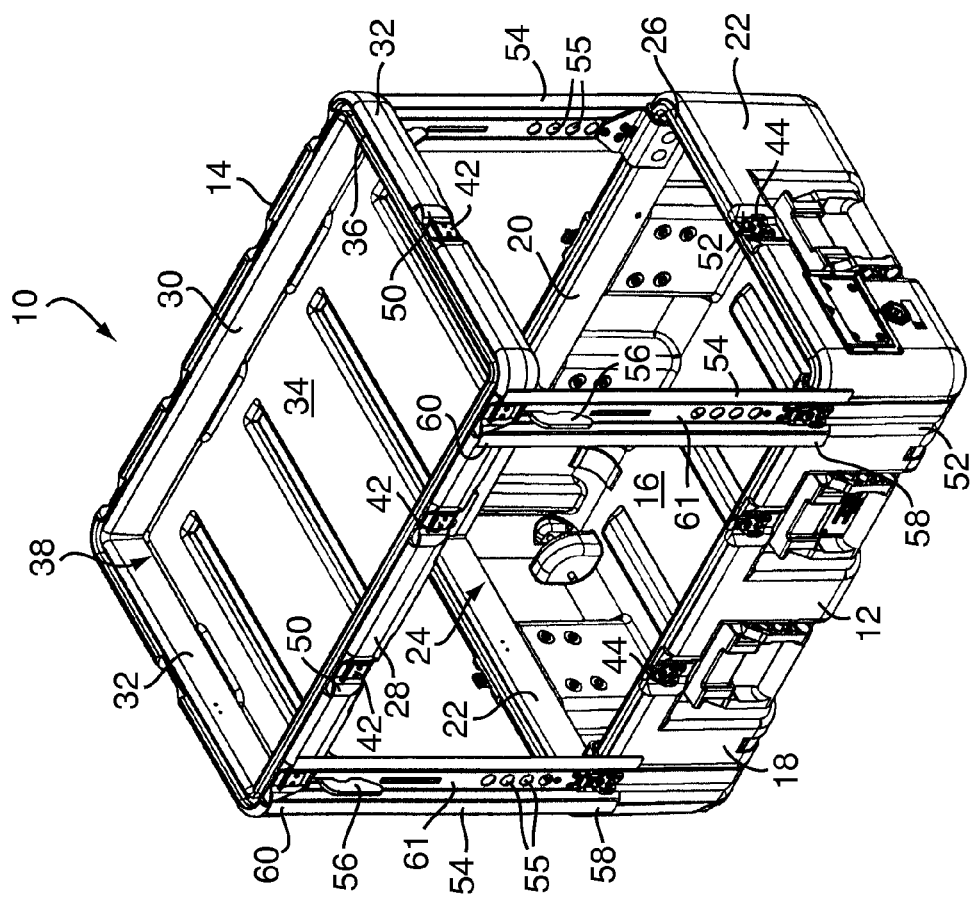
FIG. 2 shows a perspective view of a leg assembly according to the preferred embodiment of the present invention, with the leg assembly secured to a base and lid of the storage case of FIG. 1.
Figure 4A:
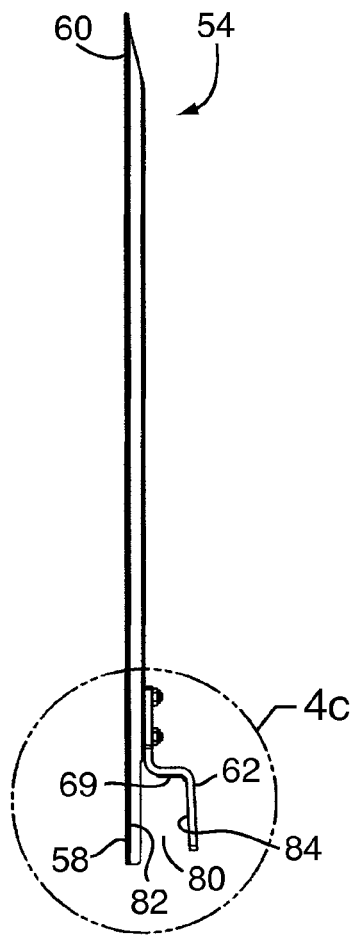
Figure 4B:
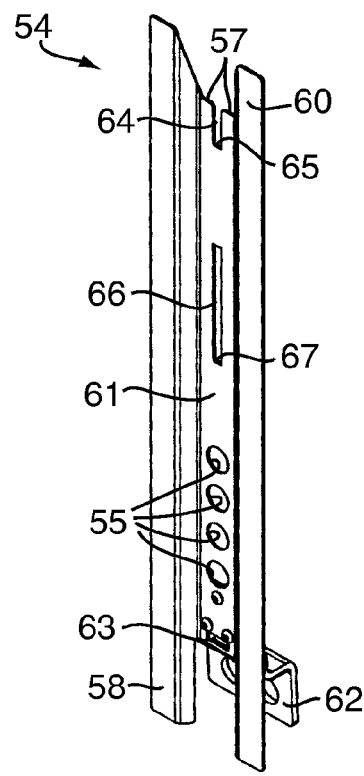
Figure 4C:
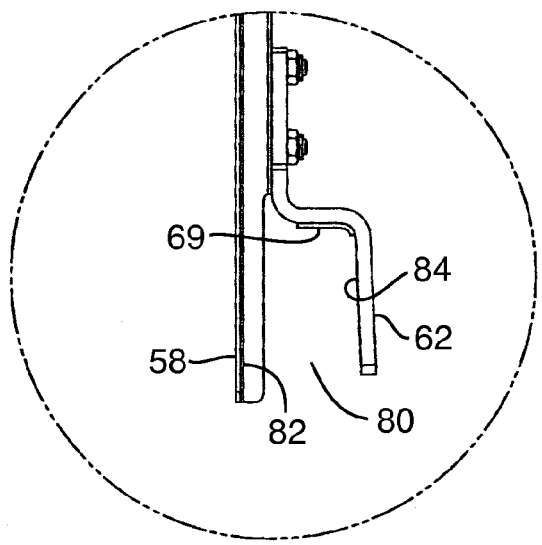

FIGS. 1 and 2 show a perspective view of a preferred embodiment of a storage case 10 and leg assembly according to the present invention. The case 10 includes a bottom portion or base 12 and a top portion or lid 14. The base 12 has a horizontal bottom panel 16 and four vertical panels or walls, which include a front wall 18, a rear wall 20, and two sidewalls 22. The vertical walls form an inner cavity 24. The base 12 also has a parting line edge 26 member around the periphery of the vertical walls. The term "parting line" refers to the portion of a case where the base and lid meet. Similarly, the lid includes four vertical panels or walls, i.e., a front wall 28, a rear wall 30, and two sidewalls 32. The lid 14 includes a horizontal bottom panel 34 and peripheral parting line edge member 36, which aligns with the parting line member 26 of the base 12 when the case 10 is closed. The bottom panel 34 and vertical panels of the lid 14 form an inner cavity 38.

The case is secured in a closed position through the use of multiple latching mechanisms 40 spaced apart along the vertical walls of the base and lid. Each latching mechanism 40 is comprised of a strike 42 that is secured to the case lid 14 and a latch 44 on the base 12 that is in alignment with the strike 42. The latch 44 has a hooked upper portion 46 that is designed to engage the strike 42. The latch also includes a cam member 48, which allows the hooked upper portion 46 to be clamped down on the strike 42 to secure the lid 14 to the base 12. Each strike 42 and latch 44 are located in aligned recesses in the lid and base, 50, 52 respectively. The general operation of the above-described latching mechanism is described in U.S. Pat. No. 5,370,254, which is incorporated by reference in its entirety herein.

The case 10 is preferably manufactured from plastic through a rotomolding process. As will be readily appreciated, however, other materials and processes may be utilized provided they are suitable to protect whatever equipment or supplies are stored within the case.

The preferred embodiment of the inventive leg assembly for use with the case 10 is depicted in FIG. 2. As shown, the assembly is comprised of four generally linear legs 54. The legs 54 are attached to the front and back walls of the base, 18, 20, and the front and back walls of the lid, 28, 30. The legs 54 extend from the base 12 to the lid 14 to support and stabilize the lid 14 enabling it to function effectively as support surface. The legs 54 are attached to portions of the front and back walls of the base 12 and lid 14 that are proximate the sidewalls, 22, 32. The legs are preferably manufactured from a lightweight metal and, in one configuration, are 0.06-inches thick. The legs also have a series of spaced apart apertures or holes 55 which reduce weight.

The location of the legs on the base and lid are an important aspect of the present invention as they allow easy access to the interior cavity 24 of the base. Prior art support structures have relatively wide legs located on the sides and back of base and lid hindering access to the interior of the base. As will be appreciated, in military and medical applications efficiency is critical. Moreover, the legs are located such that they do not extend out from the base or lid and therefore do not require any additional floor space.

As shown, the legs 54 have a lower portion or end 58 and a generally U-shaped upper portion or end 60 and a central body portion 61. The upper end 60 attaches to the lid 14 and the lower end 58 attaches to the base 12. The upper end 60 includes a flat portion 57 and upper and lower slots 64, 66. The legs 54 are shaped to fit into the lid and base recesses 50, 52, respectively. Preferably, the legs 54 have a corrugated cross-section or profile, which corresponds to the shape of the recesses 50, 52 and increases strength of the legs. The interengagement or mating of the legs 54 and recesses 50, 52 helps align the lid 14 and base 12 for use as a support structure. As discussed in greater detail below, the legs 54 are also connected and stabilized by two cross members 56, which extend between the front and back leg on opposite sides of the base 12 and lid 14.

The mating relationship of the legs and the recesses of the base and lid are yet another important aspect of the present invention. The recesses help to locate the legs so that they are properly aligned and stabilize the support structure preventing lateral movement. Known cases do not include this feature. As such, the mating relationship imparts a structural stability not found in the art.

Turning now to FIG. 3a-FIG. 5b, the legs 54 are secured to the base 12 through mounting brackets 62, that are attached to the lower end 58 of each leg. As shown in FIGS. 4a and 4c, the mounting bracket 62 and lower leg end 58 form a substantially U-shaped bracket or opening 80 in which the lower end of the leg 58 forms a first sidewall 82 and a downwardly extending portion of the mounting bracket 62 forms a second sidewall 84. When installed, the first and second sidewalls 82, 84 of the legs 54 are placed over the front wall 18 of the base 12 so that the front wall 18 is between the sidewalls 82, 84. When attached, the brackets 62 distribute weight from the legs, cross members and lid on the base parting line 26 and abutingly contact the interior and exterior of the front wall 18 of the base 12 providing stability to the legs 54. The mounting brackets 62, which are load bearing, are preferably manufactured from a strong, lightweight metal such as aluminum/magnesium alloy 5052-H32. Other materials may be used as long as they are sufficiently strong to prevent a material failure.

The first and second sidewalls 82, 84 are important aspects of the present invention. Unlike known support structures which attach to either a front or back side of a base wall, the present invention employs a U-shaped bracket having two side walls 82, 84 one of which contacts a front side of a base wall and the other a back or reverse side of a base wall. This configuration provides a degree of stability and strength not achieved with known systems.

The brackets 62 also include a series of weight reducing holes 55 and are secured to the legs through a plurality of bolts or like fasteners. Further, the mounting bracket 62 preferably includes a rubber liner 69 on an inner portion of the bracket that contacts the parting line 26 to protect the line and base 12 from damage. As will be readily appreciated, it is desirable that the mounting bracket 62 be as wide as possible to distribute the weight of the legs, cross members and lid over a larger area and increase stability. The width of the mounting bracket 62 is limited, however, by an inside radius between the front wall 18 and sidewalls 22 of the base 12.

Figure 5A:
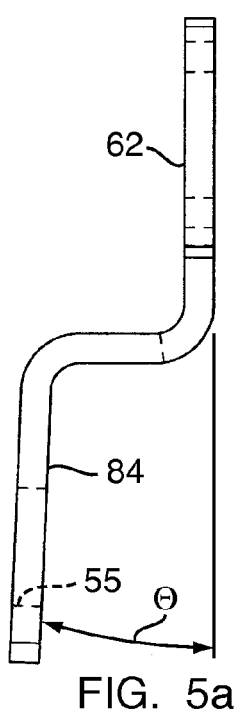
Figure 5B:
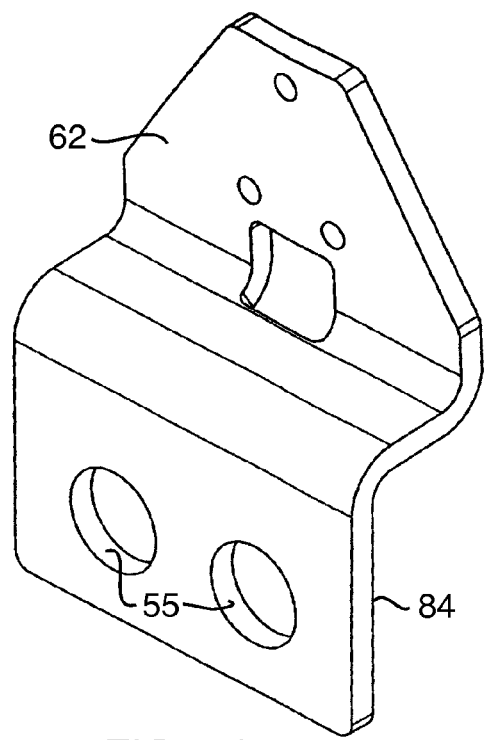

As shown in FIG. 5a, the downwardly extending leg or second sidewall 84 of the bracket 62 is angled outward and away from the leg 54 at an angle $\Theta$. As will be readily appreciated the angle is acute. The angled sidewall 84 causes the legs to extend slightly outward and away from the base 12 when the cross member is not installed. Upon the addition of a cross member, the legs move inward to a substantially vertical position and the mounting bracket 62 contacts the latch 44 to effectively "preload" the leg 54 with the latching mechanism 40 so that the latch may then be cammed downward to secure the leg 54 to the base 12.

Figure 3B:
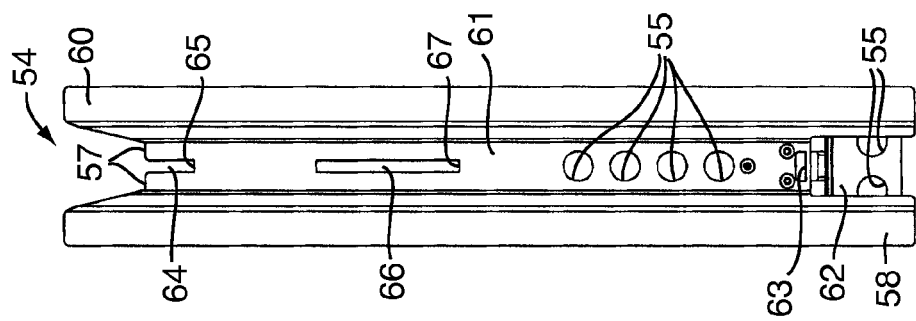
Figure 3A:
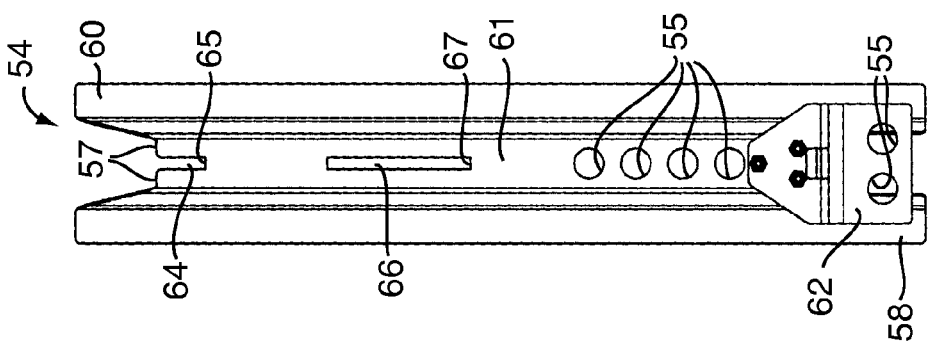
FIG. 3a shows a front view of a single leg and mounting bracket of the leg assembly of FIG. 2.
Figure 7:
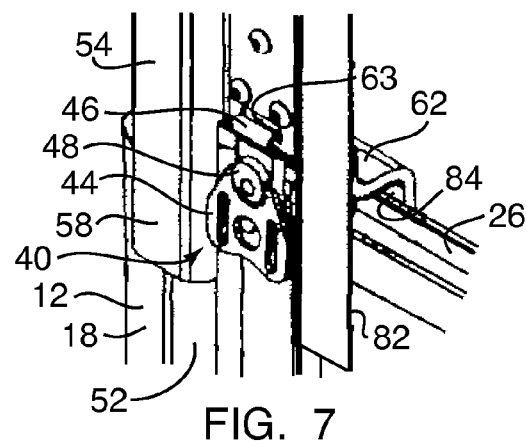
FIG. 7 shows an enlarged perspective view of the bottom portion of the single leg of FIG. 3a wherein the leg has been secured to a base of a storage case through a latching mechanism.

In addition to the mounting brackets 62, the legs 54 are secured to the base 12 through the case's latching mechanism 40. As shown in FIGS. 3a, 3b and 7 the lower end 58 of each leg 54 includes a latching slot 63 that is sized to accommodate the hooked upper portion 46 of the latch 44 that is normally used to secure the lid 14 to the base 12. When a leg 46 is secured to the base 12, the mounting bracket 62 is first placed on the front wall so that it extends into the base inner cavity and the leg 54 is lowered toward the base. After the leg 54 has been lowered a certain distance, the hooked upper portion 46 of the latch 44 is placed through the latching slot 63 and the latch 44 is urged downward thereby securing the leg 54 to the base 12.

The attachment of the legs to the base 12 through the latching mechanism 40 is yet another important aspect of the present invention. Known cases use a passive attachment means in which legs are simply inserted in metal brackets on the exterior of a case. Repeated use of such cases in the field leads to increased lateral movement of the legs and renders the cases unstable. In sharp contrast, the present invention employs both a mounting bracket and an active latching system in which the mechanism used to latch the lid to the base is utilized to secure and stabilize the legs. As will be readily appreciated, stability of support structures is critically important in medical and military applications for which many of such cases are used. The active latching mechanism of the present invention provides a level of stability and strength not found in known cases.

Referring back to FIG. 2, the lid 14 rests on the cross members 56 which are attached to the legs 54. The lid 14 is held in place by the inter-engagement of the corrugated profile of the leg 54 and the lid recess 50 which have corresponding or mating surfaces. As discussed above, this inter-engagement prevents the lateral movement of the lid 14 relative to the legs 54 and base 12.

The cross members 56 are secured to the legs 54 at attachment points located on the legs. More specifically, the cross members 56 are attached to the legs 54 through slots machined in the body 61 of each leg. The slots are sized and shaped to accept the cross members 56, support the lid 14, and provide stability. As shown, there are two attachment points or slots per leg 54, an upper slot 64 and a lower slot 66. The cross members 56 may be placed in either the upper or lower slots 64, 66 depending on the size of the lid 14. In its preferred configuration, the upper slot 64 allows a 2-inch deep lid to be employed. The lower slots 66 provide for the use of a deeper lid having 9-inch sidewalls. The upper slot 64 is located at the upper end 60 of each leg 54 and has an open end into which the cross member 56 is lowered. The lower slot 66 is located at approximately the midpoint of each leg 54 and does not include an open end. As such, the cross member 56 is inserted laterally into the lower slot 66 and then lowered into position. As will be appreciated, the upper and lower slots are located at the same positions on each leg 54 in the assembly so that the cross members 56, when installed, are horizontal and parallel to the lid. Both the upper slot 64 and lower slot 66 have end portions 65, 67, respectively, which support the weight of an inserted cross member 56 and the lid 14.

The slots 64, 66 are spaced on the leg body 61 so that top of the leg 54 is flush with the parting line 36 of the lids. That is, if the lower slot 66 is employed with a 9-inch lid 14, the top of the legs 54 are flush with the parting line 36. If the upper slot 64 is used with a 2-inch lid 14, the top is flush with the parting line 36 as well. This keeps the lids 14, i.e., the table top, at a consistent comfortable height regardless of whether a 2 or 9-inch lid is used. Additionally, the distance between the flat portion 57 of each leg 54 and the top of a cross member 56 installed in the upper slot 64 is great enough so that a lid 14 can be placed cavity side down without damaging the strikes 42 on the lid exterior.

The leg slots are a significant aspect of the present invention as they allow cross members to be attached at multiple locations to accommodate lids, and cases, of various sizes. Known cases do not allow for this and would require multiple sets of legs for each size case. This would require the manufacture, stocking and deployment of multiple leg sets, which is inefficient and expensive.

Figure 6:
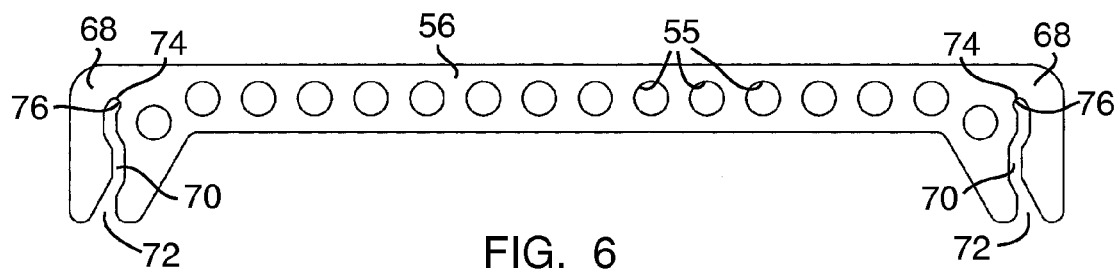
FIG. 6 shows a side view of a cross-brace according to the preferred embodiment of the present invention.

Turning now to FIG. 6, the cross members 56 are generally linear in shape and include two opposing end portions 68. Each end portion 68 has a mounting slot 70 that is generally S-shaped with an open end 72 and a terminal end 74 having an abutment surface 76. The abutment surface 76 contacts the end portions 65, 67 of the leg slots 64, 66 and is weight bearing. The mounting slot 70 is sized and shaped to accommodate attachment to the legs 54. When a cross member 56 is inserted into a leg slot 64 or 66, a portion of each leg 54 directly below each leg slot extends into the mounting slot 70 of the cross member 56 until the end portion 65, 67 of the mounting slot 70 contacts the abutment surface 76 of the leg slot.

The shape of the mounting slot 70 is such that there are four points of contact between each leg 54 and an inserted cross-member 56. The contact between the abutment surface 76 of the cross member 64 and the end portions of the leg slots 65, 67 is weight bearing. The remaining three points of contact between the mounting slot 70 and the body portion 61 of each leg 54 provide stability. This configuration, as opposed to a linear mounting slot, reduces friction between the legs and cross members and simplifies the manufacturing process.

The cross members are preferably manufactured from a lightweight metal. In a preferred embodiment, the cross members are 0.25-inch thick aluminum. This thickness was chosen to maximize the contact area of each cross member 56 and the lid 14. As will be appreciated, thicker materials may be used provided they are sufficiently lightweight and strong. The cross members also contain cut away holes 55 to reduce weight.

As will be readily appreciated, the cross members are another important feature of the present invention. The cross members act to stabilize the legs and securely support the lid. Known cases do not include cross members or any ancillary support structure other than the legs themselves. The cross members of the present invention help create a support that can be used under the most rigorous of conditions and deployments.

Although the cross members 62 are a critical component of the present invention, the legs 54 may be used temporarily without cross members if they are unavailable. In this configuration, the strike 42 of the lid 14 contacts the flat portion 57 of the leg 54 to support the lid 14 (FIGS. 2 and 3b).

FIGS. 8a-8d graphically depict the assembly of the preferred embodiment of the present invention. The mounting brackets 62 of the legs 54 are first attached to the base 12 by placing them over the front and rear walls 18, 20. The cross members 56 are then inserted in the leg slots 64, 66 until the abutment surfaces 76 of the mounting slots 70 contact the terminal ends 74 of the leg slots. The hooked upper portion 46 of the latch 44 is then inserted through the latching slot and the latch is closed securing the legs to the base. The lid 14 is then lowered onto the cross members so that it rests on the cross members and so that its recesses 50 matingly engage the legs 54 securing the lid 14 and preventing its lateral movement.

As will be appreciated, the present invention also has utility without the lid 14 and without all four legs 54. For example, a single leg 54 may be attached to the base 12 for use as a support structure for hanging equipment such as IV bags.

In sum, the present invention through the use of an active latching system, mounting brackets, slots, cross members and mating surfaces, provides a support structure that is stronger, lighter and more stable than known systems. Moreover, the present invention provides a versatile support assembly that can be used with cases of various sizes and capacities. Known cases do not provide these benefits.

While many advantages of the present invention can be clearly seen from the preferred embodiment described, it will be understood that the present invention is not limited to such an embodiment. Those skilled in the art will appreciate that many alterations and variations are possible within the scope of the present invention.

What is claimed is:

1. A leg assembly for selective attachment to a storage case having a base and removable lid, said base having a front wall, a rear wall and two opposed sidewalls, said front wall and said rear wall having a length greater than a length of said sidewalls, wherein said storage case can alternatively function as a portable support structure, said leg assembly comprising:
   two pairs of legs including a first pair selectively attachable to said front wall of said base adjacent opposing front corners and proximate said sidewalls and a second pair selectively attachable to said rear wall of said base adjacent opposing rear corners and proximate said sidewalls, each of said legs having an upper end, a lower end, and a central body portion;
   at least one cross member extending between two of said legs to stabilize and prevent lateral movement of said legs;
   wherein, when attached, said legs extend from said base to said lid thereby supporting said lid, said first pair and said second pair being substantially parallel to one another; and
   wherein each of said legs includes a bracket formed on a distal portion thereof, said bracket including a first wall and a second wall for capturing one of said front wall and said rear wall therebetween when said legs are attached to said front and said rear walls.

2. The leg assembly of claim 1, further comprising:
   a latching mechanism which secures said lid to said base when said portable support assembly is configured as a storage case, said latching mechanism including a strike located on said lid, a latch having a hooked upper portion, said latch being located on said base, and a cam member in operative connection with said latch; and
   wherein said hooked upper portion of said latch engages said strike and is cammed downward by said cam member to secure said lid to said base.

3. The leg assembly of claim 2, wherein said lower end of said legs includes a latching slot, said latching slot being configured to receive said hooked upper portion of said latch; and
   wherein said legs may be removably secured to said base by placing said hooked upper portion of said latch in said latching slot and camming said hooked upper portion downward with said cam member.

4. The leg assembly of claim 1, wherein each of said legs includes at least two attachment points at different positions on said legs that permit said cross member to be selectively attached to said legs at said attachment points to accommodate lids of varying depths.

5. The leg assembly of claim 4, wherein said attachment points comprise slots in said legs that are configured to receive said cross member; and
   wherein said cross member is inserted into said slots to secure said cross member to said leg.

6. The leg assembly of claim 5, wherein said cross member is generally linear and has two opposite distal end portions, each of said distal end portions includes a mounting slot having an open end and a closed end having an abutment surface, said mounting slots allowing said cross member to be secured between two legs; and
   wherein, after said cross member is inserted into said leg slot, said cross member is lowered such that a portion of said leg below said leg slot extends into said open end of said mounting slot until said portion contacts said abutment surface.

7. The leg assembly of claim 1, wherein said lower end of said legs includes an attachment bracket, said bracket extending into an interior cavity and allowing said legs to be removably attached to said base.

8. A portable support structure that may be alternatively used as a storage case, said portable support structure comprising:
   a base having a front wall, a back wall, two side walls and a bottom wall, said front, back and side walls being generally perpendicular to said bottom wall, said walls defining an interior cavity of said base;
   a lid, having a front panel, rear panel and two side panels, that is selectively removable from said base to convert said base and lid from a storage case to a support structure;
   two pairs of legs including a first pair selectively attachable to said front wall of said base adjacent opposing front corners and proximate said sidewalls and a second pair selectively attachable to said back wall of said base adjacent opposing rear corners and proximate said sidewalls, each leg having an upper end, a lower end and a central body portion, said legs being selectively attachable to both said base and lid, and, when attached, said legs extending from said base to said lid thereby supporting said lid and defining a support structure assembled position, said first pair and said second pair being substantially parallel to one another;
   at least one cross member extending between two of said legs to stabilize and prevent lateral movement of said legs;
   wherein said cross member abutingly engages, contacts and supports said lid when in said support structure assembled position whereby said base and lid function as a support structure; and
   wherein each of said legs includes a bracket formed on a distal portion thereof, said bracket including a first wall and a second wall for capturing one of said front wall and said rear wall therebetween when said legs are attached to said front and said rear walls.

9. The portable support structure of claim 8, further comprising:
   a latching mechanism which secures said lid to said base when said portable support assembly is configured as a storage case, said latching mechanism including a strike located on said lid, a latch having a hooked upper portion, said latch being located on said base, and a cam member in operative connection with said latch; and
   wherein said hooked upper portion of said latch engages said strike and is cammed downward by said cam member to secure said lid to said base.

10. The portable support structure of claim 9, wherein said legs include a latching slot located on said lower end, said latching slot being configured to receive said hooked upper portion of said latch; and
    wherein said leg may be selectively secured to said base by placing said hooked upper portion of said latch in said latching slot and camming said hooked upper portion downward with said cam member.

11. The portable support structure of claim 8, wherein each of said legs includes at least two attachment points at different locations on said legs that permit said cross member to be selectively attached to said legs at said attachment points to accommodate lids of varying depths.

12. The portable support structure of claim 11, wherein said attachment points comprise slots in said legs that are configured to receive said cross member; and
- wherein said cross member is inserted into said slots to secure said cross member to said leg.

13. The portable support structure of claim 12, wherein said cross member is generally linear and has two opposite distal end portions, each of said distal end portions include a mounting slot having an open end and a closed end having an abutment surface, said mounting slots allowing said cross member to be secured between two legs; and
- wherein, after said cross member is inserted into said leg slot, said cross member is lowered such that a portion of said leg below said leg slot extends into said open end of said mounting slot until said leg contacts said abutment surface.

14. The portable support structure of claim 8, wherein said lower end of said legs includes an attachment bracket, said bracket extending into said interior cavity and allowing said legs to be removably attached to said front, back or sides walls of said base.

15. The portable support structure of claim 8, wherein said lid and said base have recesses in said front, back and side walls, said recesses having a profile; and
- wherein said legs have a shape that corresponds to said profile of said recesses so that said legs fit into said recesses when they attached to said base and lid thereby limiting lateral movement of said legs.

16. The portable support structure of claim 15, wherein said legs have a corrugated shape.

* * * * *